(12) United States Patent
Takemura et al.

(10) Patent No.: US 6,248,261 B1
(45) Date of Patent: Jun. 19, 2001

(54) ELECTROLUMINESCENT PHOSPHOR AND ELECTROLUMINESCENT ELEMENT USING THE SAME

(75) Inventors: Hirofumi Takemura, Kamakura; Yohe Shimizu, Shizuoka-ken; Takeshi Takahara; Mitsuhiro Oikawa, both of Yokohama, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/379,324

(22) Filed: Aug. 23, 1999

(30) Foreign Application Priority Data

Aug. 26, 1998 (JP) ................................. P10-240730

(51) Int. Cl.$^7$ .................................................. C09K 11/56
(52) U.S. Cl. .................... 252/301.6 S; 313/503; 313/506; 428/403; 428/404
(58) Field of Search ............... 252/301.6 S; 428/404, 428/403; 313/503, 506

(56) References Cited

U.S. PATENT DOCUMENTS

| | | | |
|---|---|---|---|
| 2,952,642 | 9/1960 | Davis et al. ...................... | 252/301.6 |
| 2,957,830 | 10/1960 | Goldberg et al. .................. | 252/301.6 |
| 4,740,728 | * 4/1988 | Uchida et al. .................... | 252/30.6 S |
| 4,859,361 | 8/1989 | Reilly et al. ........................ | 252/301.6 |
| 4,925,593 | * 5/1990 | Borchardt et al. .............. | 252/301.6 S |
| 5,558,817 | * 9/1996 | Bredol et al. .................. | 252/301.6 S |
| 5,593,782 | * 1/1997 | Budd ............................ | 252/301.6 R |

FOREIGN PATENT DOCUMENTS 57-145174 * 9/1982 (JP) .
61-296085 12/1986 (JP) .

* cited by examiner

*Primary Examiner*—C. Melissa Koslow
(74) *Attorney, Agent, or Firm*—Foley & Lardner

(57) ABSTRACT

An electroluminescent phosphor comprises zinc sulfide as a phosphor base material, at least one kind selected from copper and manganese as an activator, and at least one kind selected from chlorine, bromine, iodine, and aluminum as a coactivator. The content of alkaline earth metal elements in the electroluminescent phosphor is 0.05% by weight or less. In addition, the electroluminescent phosphor includes cesium in the range of 0.0001% by weight or more and 0.01% by weight or less. Such an electroluminescent phosphor has excellent brightness and life. An electroluminescent element comprises a phosphor layer in which an electroluminescent phosphor is dispersed in a dielectric. The electroluminescent phosphor includes reduced amount of alkaline earth metal elements and a slight amount of cesium.

22 Claims, 1 Drawing Sheet

ELECTROLUMINESCENT PHOSPHOR AND ELECTROLUMINESCENT ELEMENT USING THE SAME

BACKGROUND OF THE INVENTION

1. Field of the Invention

The present invention relates to an electroluminescent phosphor and an electroluminescent element using the same.

2. Description of the Related Art

An electroluminescent element is prepared in the following way. A phosphor layer has an electroluminescent phosphor dispersed in a dielectric material. On both surfaces of the phosphor layer, electrodes are disposed. At least one of them is a transparent electrode. An alternating voltage is applied between the electrodes to make the electroluminescent element luminesce. Electroluminescent elements are mainly used in display devices or backlighting of display devices.

An electroluminescent phosphor for use with electroluminescent elements generally comprises zinc sulfide as a phosphor base material, at least one kind of copper and manganese as an activator, and at least one kind of chlorine, bromine, iodine and aluminum as a coactivator.

An electroluminescent phosphor based on zinc sulfide is prepared in the following way, for instance. First, zinc sulfide as a base material is mixed with an activator source and a coactivator source. Further, magnesium chloride, barium chloride, sodium chloride or the like is added thereto as a crystal growth agent, followed by thorough mixing. This mixture is fired at a temperature in the range of from 1000 to 1300° C. to form an intermediate. The intermediate, after being crushed, is heated at a temperature in the range of from 600 to 1000° C. Thereby, a zinc sulfide system electroluminescent phosphor including an activator and a coactivator is obtained (cf. U.S. Pat. No. 2,957,830). The added crystal growth agent is removed by washing the fired body with water (cf. U.S. Pat. No. 4,859,361).

The existing zinc sulfide system electroluminescent phosphor can not necessarily satisfy characteristics demanded for display devices such as brightness and life. That is, there are problems to be improved. Accordingly, so far a variety of kinds of improvements have been applied to zinc sulfide system electroluminescent phosphors.

For instance, zinc sulfide is known to take a crystallographic structure of hexagonal system at a temperature of 1020° C. or more and that of cubic system at a temperature below that. Luminescent efficiency due to electroluminescence is higher for the cubic system. However, rather than getting the cubic system from the beginning, by transforming to the cubic system through the hexagonal system, the luminescent efficiency can be made higher.

Japanese Patent Laid-Open Publication (KOKAI) No. Sho 61-296085 discloses a method of transforming the crystal system of zinc sulfide system electroluminescent phosphor. According to this method, to zinc sulfide mixed with an activator a compound of alkali metal element and a compound of alkaline earth metal element are added to form an intermediate of hexagonal system. Thereafter, by applying high pressure, a zinc sulfide system electroluminescent phosphor of cubic system is obtained.

Japanese Patent Laid-Open Publication (KOKAI) No. Sho 57-145174 discloses a method of improving efficiency and life of zinc sulfide system electroluminescent phosphors. In this method, the efficiency and life of zinc sulfide system electroluminescent phosphors are improved by optimizing the addition amount of the aforementioned activator and coactivator.

As described above, various kinds of methods of improving the luminescent efficiency and life of the existing zinc sulfide system electroluminescent phosphors have been proposed. However, the existing methods are gradually becoming incapable of satisfying the present requirement level for brightness and life. In particular, recent display devices are demanded to improve further the brightness and life. Accordingly, electroluminescent phosphors being used with them are demanded to improve further the brightness and life.

U.S. Pat. No. 2,952,642 discloses a zinc sulfide system electroluminescent phosphor that includes lead and copper as activator, and 0.001% of magnesium. However, the zinc sulfide phosphor including lead is still poor in emission efficiency and life characteristic, accordingly it can not satisfy performance that the market demands.

SUMMARY OF THE INVENTION

Accordingly, an object of the present invention is to provide an electroluminescent phosphor that has high brightness and enables to maintain such high brightness over a long time. Another object of the present invention is to provide an electroluminescent element of higher brightness and longer life.

An electroluminescent phosphor of the present invention comprises a phosphor base material consisting essentially of zinc sulfide, at least one kind of activator selected from copper and manganese that is included in the phosphor base material, and at least one kind of coactivator selected from chlorine, bromine, iodine and aluminum that is included in the phosphor base material. In the electroluminescent phosphor, the content of alkaline earth metal elements is 0.05% by weight or less, and cesium is included in the range of from 0.0001% by weight or more to 0.01% by weight or less.

Another electroluminescent phosphor of the present invention comprises a phosphor base material consisting essentially of zinc sulfide, at least one kind of activator selected from copper and manganese that is included in the phosphor base material, and at least one kind of coactivator selected from chlorine, bromine, iodine and aluminum that is included in the phosphor base material. In the electroluminescent phosphor, the content of alkaline earth metal elements is 0.05% by weight or less.

An electroluminescent element of the present invention comprises a phosphor layer containing the aforementioned electroluminescent phosphor of the present invention. In a concrete constitution of an electroluminescent element of the present invention, an electroluminescent element comprises a phosphor layer containing an electroluminescent phosphor of the present invention, a rear electrode disposed and integrated along one main surface of the phosphor layer through a reflection insulation layer, and a transparent electrode disposed opposite to the rear electrode and integrated along the other main surface of the phosphor layer.

The present inventors have carried out various kinds of experiments, discussions and speculations about how to get a higher brightness and longer life of electroluminescent phosphors. As a result of this, we have reached a conclusion that attention must be paid to the amount of crystal growth agent (flux) which is added to ingredients during synthesis of a zinc sulfide system electroluminescent phosphor and remaining in the phosphor thereafter. So far, in order to prepare zinc sulfide system electroluminescent phosphors of excellent property, compounds of alkali metal elements and compounds of alkaline earth metal elements (halogenides in particular) have been employed as a crystal growth agent. These are extremely suitable for growing zinc sulfide ingredient of a particle diameter of approximately from 1 to 3 $\mu$m to a phosphor of a particle diameter of approximately from 10 to 30 $\mu$m.

However, it was found due to the inventor's experiments that the crystal growth agent remaining in the phosphor deteriorates luminescent efficiency and life thereof. Through more detailed investigation, it was found that to the brightness and life the alkaline earth metal elements are particularly influential.

There, in the course of phosphor manufacture, a process is implemented to remove the alkaline earth metal elements remaining in the phosphor. As a result of this, it was found that electroluminescent phosphors of higher efficiency and longer life, when compared with the existing zinc sulfide system electroluminescent phosphors could be obtained. Further, it was also found that even by reducing the amount of alkaline earth metal compounds added to the phosphor ingredient, the luminescent efficiency and life of the zinc sulfide system electroluminescent phosphors can be improved.

Based on the aforementioned knowledge, in the present invention the content of the alkaline earth metal elements in an electroluminescent phosphor is stipulated to be 0.05% by weight or less. Such a content of the alkaline earth metal elements can be attained by repeating for instance hot acid washing with reproducibility. With only ordinary water washing, it is extremely difficult to attain the content of the alkaline earth metal elements of 0.05% by weight or less.

Further, by allowing cesium element to be included in the range of 0.0001% by weight or more and 0.01% by weight or less in the electroluminescent phosphor of which content of the alkaline earth metal elements is 0.05% by weight or less, the brightness and life of the zinc sulfide system electroluminescent phosphor can be further improved. The synergistic effect between the reduction of the alkaline earth metal elements and the addition of cesium element results in further improvement of the brightness and life.

DESCRIPTION OF THE PREFERRED EMBODIMENTS

Figure 1:
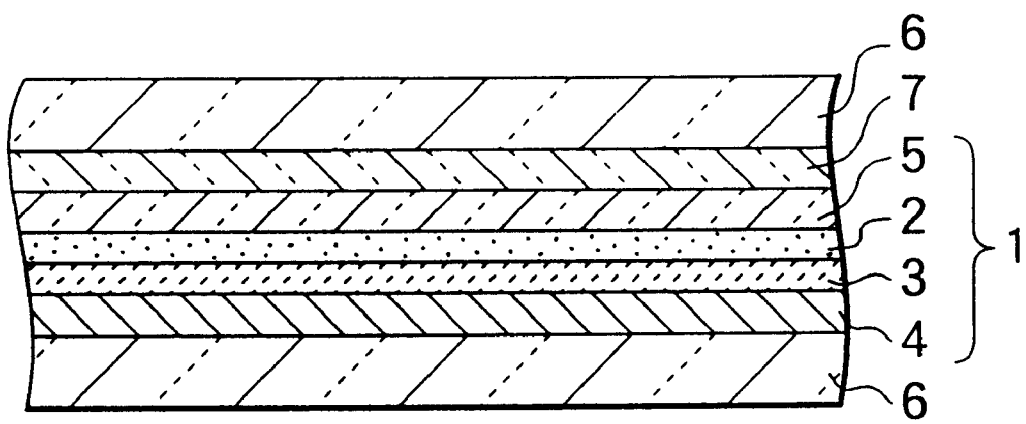
FIG. 1 is a cross section of a substantial structure of an electroluminescent element according to one embodiment of the present invention.

In the following, embodiments for practicing the present invention will be described.

An electroluminescent phosphor of the present invention comprises zinc sulfide as a phosphor base material, at least one kind of element selected from copper and manganese as an activator, and at least one kind of element selected from chlorine, bromine, iodine and aluminum as a coactivator.

An activator that is selected from copper and manganese is preferable to be included in the range of from 0.001 to 0.1% by weight with respect to a phosphor base material consisting of zinc sulfide. A coactivator that is selected from chlorine, bromine, iodine and aluminum is preferable to be included in the range of from 0.001 to 0.1% by weight with respect to a phosphor base material consisting of zinc sulfide. By including such amounts of activator and coactivator in zinc sulfide, an electroluminescent phosphor excellent in luminescent efficiency and brightness can be obtained.

An electroluminescent phosphor of the present invention, first of all by reducing the amount of the alkaline earth metal elements remaining in a zinc sulfide system phosphor, is improved in brightness and life thereof. Specifically, the total content of the alkaline earth metal elements, that is, Mg, Ca, Sr, Ba or the like, contained in a zinc sulfide system phosphor is 0.05% by weight or less. Thereby, higher brightness and longer life of the electroluminescent phosphor can be attained.

Upon preparation of an electroluminescent phosphor of higher brightness and longer life, a compound of alkaline earth metal elements is necessary as a crystal growth agent. However, after completion of the growth process of phosphor crystal, on the contrary, the alkaline earth metal element is detrimental to the higher brightness and longer life. Accordingly, in the present invention, based on the result of investigation of relationships between the remaining amount of the alkaline earth metal elements in the phosphor and the brightness and life thereof, the content of the alkaline earth metal elements is stipulated to be 0.05% by weight or less. Thereby, the higher brightness and longer life of zinc sulfide system electroluminescent phosphors can be obtained.

Among the aforementioned alkaline earth metal elements, the content of Mg element is preferable to be 0.03% by weight or less. That of Ca element is preferable to be 0.01% by weight or less. That of Sr element is preferable to be 0.01% by weight or less. That of Ba element is preferable to be 0.01% by weight or less, too. By controlling the contents of the respective elements of Mg, Ca, Sr, and Ba in the aforementioned ranges, the brightness and life of zinc sulfide system electroluminescent phosphors can be improved.

Further, a zinc sulfide system electroluminescent phosphor of the present invention is preferable to include a slight amount of cesium. In concrete, the zinc sulfide system electroluminescent phosphor is preferable to include cesium (Cs) in the range of 0.0001% by weight or more and 0.01% by weight or less. By including a slight amount of Cs in the zinc sulfide system electroluminescent phosphor that is reduced in the content of the alkaline earth metal elements, the brightness and life can be further improved. When the content of cesium is less than 0.0001% by weight, it can not exhibit the effect fully. In contrast, if the content of cesium exceeds 0.01% by weight, crystallinity of the zinc sulfide phosphor deteriorates to result in a decrease of the brightness.

The Cs element helps crystal of zinc sulfide that is phosphor base material takes in an activator and a coactivator. Thereby, the brightness and life of zinc sulfide system electroluminescent phosphors can be further improved. In particular, in the zinc sulfide system electroluminescent phosphors of which content of the alkaline earth metal elements is reduced, the effect due to Cs addition can be exhibited more effectively. Accordingly, the brightness and life of the electroluminescent phosphors can be further improved.

An electroluminescent phosphor of the present invention can be prepared by the use of for instance the following method.

That is, first a prescribed quantity of pure water is added to zinc sulfide powder of a particle diameter of from 1 to 3 $\mu$m to obtain a phosphor slurry. To this, a prescribed amount of activator source such as copper sulfate and manganese carbonate is added and the resultant mixture is mixed thoroughly. After such slurry is dried, the crystal growth agent such as magnesium chloride, barium chloride, sodium chloride or the like is added and the resultant mixture is further mixed thoroughly.

The aforementioned chlorides concurrently work as starting material of chlorine as a coactivator. When other than chlorine, bromine, iodine and aluminum is employed as a coactivator, magnesium bromide, barium iodide, aluminum fluoride or the like is added. Further, when Cs is being included in a phosphor, for instance a compound of Cs (for instance chloride) can be employed for a crystal growth agent.

Next, the aforementioned mixture is filled in a quartz crucible and fired in air at a temperature of from 1100 to 1200° C. for from 3 to 8 hours. The fired body is dispersed in pure water, followed by repetition of several times of agitation, settling and decantation to wash. By the use of such washing process, the most of the remaining crystal growth agent can be removed. However, in order to reduce the content of the alkaline earth metal elements to the aforementioned range of the present invention, further step of removing the alkaline earth metal elements is preferable to be implemented.

That is, for instance, the fired body is dispersed in pure water of which pH is adjusted by hydrochloric acid to be 1 to 3 and the dispersion is heated to a temperature of from 50 to 80° C. while agitating. Thereafter, the fired body is allowed to settle and the supernatant liquid is removed. These operations of agitation, settling and decantation are repeated successively several times. By such hot acid washing, the alkaline earth metal elements remaining in the phosphor can be reduced to 0.05% by weight or less with reproducibility. Incidentally, even by reducing the content of compounds of alkaline earth metal elements that is added to phosphor ingredient, the content of the alkaline earth metal elements remaining in the electroluminescent phosphor can be reduced.

Thereafter, the slurry was washed several times with pure water so that pH thereof becomes in the range of from 6 to 7, followed by filtration and drying. Thus obtained intermediate (hexagonal system) is compressed by the use of for instance a hydrostatic pressing at a hydrostatic pressure of from 0.5 to 2.0 ton/cm$^2$ for several minutes. Through this compression, part of phosphor crystal is transformed into cubic system. Further, after several % of zinc oxide is mixed, the mixture in a quartz crucible is fired in air under a condition of for instance a temperature of 600 to 800° C. and a period of time of from 1 to 2 hours. The fired body is dispersed in pure water and washed several times. Further, by repeating hydrochloric acid washing and neutralization pure water washing several times, an electroluminescent phosphor of the present invention is obtained.

Incidentally, when Cs is being included in the range of 0.0001% by weight or more and 0.01% by weight or less of the zinc sulfide system electroluminescent phosphor of the present invention, as described above cesium chloride or the like is employed as a crystal growth agent. The Cs content of the electroluminescent phosphor can be adjusted by controlling properly the aforementioned hot acid washing.

The electroluminescent phosphor of the present invention is employed in a phosphor layer 2 of an electroluminescent element 1 such as shown in FIG. 1. An electroluminescent element 1 shown in FIG. 1 has a phosphor layer 2 in which the aforementioned electroluminescent phosphor of the present invention is dispersed/contained in an organic polymer binder such as cyanoethyl cellulose (organic dielectric) of high permittivity.

On one main surface of the phosphor layer 2, a reflection insulation layer 3 is laminated. The reflection insulation layer 3 is formed by dispersing powder of highly reflective inorganic oxide such as $TiO_2$ or $BaTiO_3$ in an organic polymer binder having high permittivity such as cyanoethyl cellulose. A rear electrode 4 consisting of a metallic foil or a metallic film such as aluminum foil is, through the reflection insulation layer 3, disposed and integrated on one main surface of the phosphor layer 2.

On the other main surface of the phosphor layer 2, a layer of transparent electrode (transparent electrode sheet) 5 in which a film of ITO is deposited on a transparent insulation film such as polyester (PET) film is disposed and integrated. In the sheet of the transparent electrode 5, the electrode film (ITO film) is disposed to face the phosphor layer 2.

By application of thermocompression bonding to the transparent electrode layer 5, the phosphor layer 2, the reflection insulation layer 3 and the rear electrode layer 4, an electroluminescent element 1 is formed. Incidentally, though not shown in figure, an electrode is extracted from each of the rear electrode layer 4 and the transparent electrode layer 5, through these electrodes an alternating voltage is applied to the phosphor layer 2.

An electroluminescent element 1 made of the aforementioned laminate (thermocompression body) is covered by a transparent packaging film 6. Thus, an electroluminescent panel is formed. For the transparent packaging film 6, a moisture-proof film such as polychlorotrifluoroethylene (PCTFE) that is low in moisture permeability can be employed. On the side of the transparent electrode layer 3, as demand arises, a moisture absorption film 7 such as 6-nylon or the like can be disposed.

Projecting portions of these packaging films 6 are treated by thermocompression bonding to seal the electroluminescent element 1. Thereby, an electroluminescent panel (EL panel) is formed.

According to such an electroluminescent element 1 and an EL panel using the same, based on the higher brightness and longer life of the electroluminescent phosphor in the phosphor layer 2, the high brightness is attained and such high brightness can be maintained over a long period.

Further, on preparation of an electroluminescent element and an EL panel using thereof, instead of employing a moisture proof film such as PCTFE, moisture proof treatment can be applied on the surface of individual particles of electroluminescent phosphor. The electroluminescent phosphors of the present invention are also treated by moisture proof treatment due to metal oxide or resin. That is, electroluminescent phosphors of the present invention may have a protective film (moisture proof layer) consisting of at least one kind selected from alumina, silica and titania. Even in such a constitution, the higher brightness and longer life can be attained.

Figure 2:
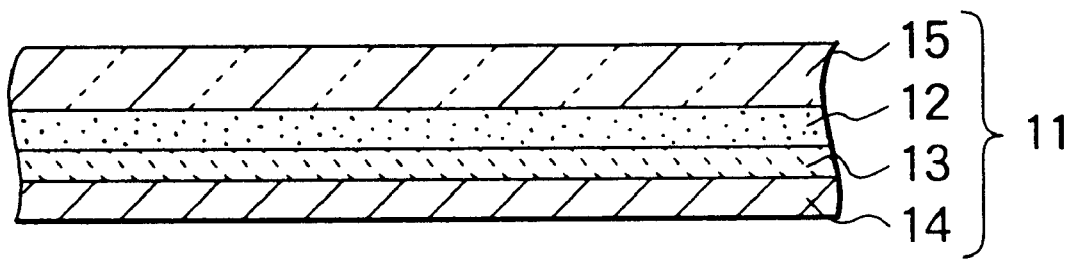
FIG. 2 is a cross section of a substantial structure of an electroluminescent element according to another embodiment of the present invention.

FIG. 2 shows an electroluminescent element 11 that employs an electroluminescent phosphor on the surface of which the aforementioned protective layer is formed. The electroluminescent element 11 shown in FIG. 2 has a phosphor layer 12 in which the electroluminescent phosphor of the present invention of which individual particle is covered by the protective film is dispersed in an organic polymer binder. Particles of the electroluminescent phosphor that are covered by the protective film, being moisture proof by themselves, can prevent the luminescent property of the electroluminescent phosphor from deteriorating due to moisture without resorting to a measure such as a moisture absorption film or a moisture proof film.

As identical as the electroluminescent element 1 shown in FIG. 1, on one main surface of a phosphor layer 12, a rear electrode layer 14 is laminated integrated through a reflection insulation layer 13. On the other main surface of the phosphor layer 12, a transparent electrode layer (transparent electrode sheet) 15 is laminated integrated. By printing a slurry by the use of for instance screen printing method, the rear electrode layer 14 may be formed. The slurry is prepared by mixing metallic powder or carbon powder together with a binder. On the further internal side of the rear electrode layer 14, as demand arises, a rear insulation layer (not shown in the figure) is laminated to secure insulation of the rear side of the electroluminescent element.

Next, concrete embodiments of the present invention and results thereof will be described.

Embodiment 1

500 ml of pure water was added to powder of 500 g of zinc sulfide of a particle diameter of approximately 2 $\mu$m to form a slurry. Thereto, 1.5 g of copper sulfate is added, followed by 30-min agitation. The slurry was dried at a temperature of 150° C. for 12 hours. Thereafter, 40 g of magnesium chloride, 40 g of barium chloride and 20 g of sodium chloride were added, followed by thorough mixing. The mixture was filled in a quartz crucible, followed by 4 hour firing in air at a temperature of 1150° C.

The fired body was dispersed in pure water of 2000 ml, and agitation, settling and decantation were successively repeated three times each. Then, while agitating in pure water of which pH was adjusted to be 2.0 by addition of hydrochloric acid, the slurry was heated to a temperature of 70° C. Thereafter, settling and decantation were carried out. Similarly, agitation, settling and decantation were successively repeated three times each. Thereafter, by repeating pure water washing five times, the pH was adjusted to be from 6 to 7, followed by filtration and drying.

The obtained intermediate (hexagonal) was pressed by the use of a hydrostatic pressing at a hydrostatic pressure of 1 ton/cm$^2$ for 5 min. The pressed intermediate was crushed. 300 g of the crushed intermediate was mixed with 15 g of zinc oxide. The mixture was fired in a quartz crucible in air at a temperature of 750° C. for 1.5 hour. The fired body was dispersed in pure water, followed by three times of pure water washing. Thereafter, at a condition of pH=1.5, hydrochloric acid washing was carried out. Pure water washing was repeated five times, followed by filtration, drying and sieving. Thus, an electroluminescent phosphor of the present invention (ZnS: Cu, Cl) was obtained.

Thus obtained zinc sulfide system electroluminescent phosphor was subjected to chemical analysis. As a result of this, it was found that the remaining amount of alkaline earth metal elements (total amount of Mg, Ca, Sr and Ba) was 0.05% by weight. With the obtained zinc sulfide system electroluminescent phosphor, an electroluminescent element shown in FIG. 1 was prepared and brightness and life were evaluated. The results are shown in Table 1. Here, the brightness was measured under conditions of an applied voltage of 100 V/400 Hz (alternating voltage): an electric field applied on a phosphor layer of 4000 V/cm: and an environment of 20° C.–60% RT. The electroluminescent element was held on under the above conditions for measuring the brightness. With a time when the brightness became one half the initial brightness, the life was evaluated. The measurement was carried out in a thermostat of 20° C.–60% RT.

COMPARATIVE EXAMPLE 1

Embodiments 2 to 5

Same as Embodiment 1, an electroluminescent phosphor of the present invention was prepared. At this time, by changing the washing condition, the remaining amounts of the alkaline earth metal elements in the zinc sulfide system electroluminescent phosphors (ZnS: Cu, Cl) were varied. For an electroluminescent phosphor as comparative example 1, without employing hydrochloric acid in the washing process, only pure water is employed. With these zinc sulfide system electroluminescent phosphors, similarly with embodiment 1 electroluminescent elements were prepared. Their brightness and life were measured as identical as embodiment 1. These results are shown as well in Table 1.

TABLE 1

|  | Remaining amount of alkaline earth metal elements (% by weight) | Brightness (cd/m$^2$) | Life (hours) |
| --- | --- | --- | --- |
| Comparative Example 1 | 0.1 | 70 | 1000 |
| Embodiment 1 | 0.05 | 100 | 1200 |
| Embodiment 2 | 0.03 | 120 | 1500 |
| Embodiment 3 | 0.01 | 130 | 1600 |
| Embodiment 4 | 0.005 | 135 | 1600 |
| Embodiment 5 | 0.001 | 140 | 1700 |

As obvious from Table 1, for Embodiment 1 where the remaining amount of the alkaline earth metal elements in the zinc sulfide system electroluminescent phosphor was 0.05% by weight, the brightness was approximately 1.4 times that of comparative example 1 (conventional one), and the life was 1.2 times the same. Further, when the remaining amount of the alkaline earth metal elements was 0.03% by weight or less, the brightness became approximately 1.7 times or more, and the life became 1.5 times or more.

Embodiment 6

500 ml of pure water was added to powder of 500 g of zinc sulfide of a particle diameter of approximately 2 $\mu$m to form a slurry. Thereto, 1.5 g of copper sulfate is added, followed by 30-min agitation. The slurry was dried at a temperature of 150° C. for 12 hours. Thereafter, 10 g of magnesium chloride, 40 g of barium chloride and 50 g of sodium chloride were added, followed by thorough mixing. The mixture was filled in a quartz crucible, followed by 4-hour firing in air at a temperature of 1150° C.

The fired body was dispersed in pure water of 2000 ml, and agitation, settling and decantation were successively repeated three times each. Then, while agitating in pure water of which pH was adjusted to be 2.0 by addition of hydrochloric acid, the slurry was heated to a temperature of 70° C. Thereafter, settling and decantation were carried out. Similarly, agitation, settling and decantation were successively repeated three times each. Thereafter, by repeating pure water washing five times, the pH was adjusted to be from 6 to 7, followed by filtration and drying.

The obtained intermediate (hexagonal) was pressed by the use of a hydrostatic pressing at a hydrostatic pressure of 1 ton/cm$^2$ for 5 min. The pressed intermediate was crushed. 300 g of the crushed intermediate was mixed with 15 g of zinc oxide. The mixture was fired in a quartz crucible in air at a temperature of 750° C. for 1.5 hour. The fired body was dispersed in pure water for washing. This process was repeated three times. Thereafter, at a condition of pH=1.5, hydrochloric acid washing was carried out. Pure water washing was repeated five times, followed by filtration, drying and sieving. Thus, an electroluminescent phosphor (ZnS: Cu, Cl) was obtained.

Thus obtained zinc sulfide system electroluminescent phosphor was subjected to chemical analysis. The remaining amount of Mg element was 0.03% by weight. With the obtained zinc sulfide system electroluminescent phosphor, an electroluminescent element was prepared similarly as embodiment 1 and the brightness and life were evaluated similarly. The results are shown in Table 2.

COMPARATIVE EXAMPLES 2 TO 5

Embodiments 7 to 18

Except for changing an amount of crystal growth agent added to the ingredient, as identical as Embodiment 6, the respective electroluminescent phosphors of the present invention were prepared. With these zinc sulfide system electroluminescent phosphors, similarly with Embodiment 1, the respective electroluminescent elements were prepared. The brightness and life thereof were measured respectively. The results are shown in Tables 2 to 5.

With Embodiments 6 to 9 in Table 2, relationship between the remaining amount of Mg element and the brightness and life was evaluated. With Embodiments 10 to 12 in Table 3, relationship between the remaining amount of Ca element and the brightness and life was evaluated. With Embodiments 13 to 15 in Table 4, relationship between the remaining amount of Sr element and the brightness and life was evaluated. With Embodiments 16 to 18 in Table 5, relationship between the remaining amount of Ba element and the brightness and life was evaluated.

TABLE 2

|  | Remaining amount of Mg element (% by weight) | Brightness (cd/m$^2$) | Life (hours) |
| --- | --- | --- | --- |
| Comparative Example 2 | 0.04 | 70 | 1000 |
| Embodiment 6 | 0.03 | 100 | 1200 |
| Embodiment 7 | 0.01 | 120 | 1500 |
| Embodiment 8 | 0.005 | 120 | 1500 |
| Embodiment 9 | 0.001 | 120 | 1500 |

TABLE 3

|  | Remaining amount of Ca element (% by weight) | Brightness (cd/m$^2$) | Life (hours) |
| --- | --- | --- | --- |
| Comparative Example 3 | 0.02 | 70 | 1000 |
| Embodiment 10 | 0.01 | 100 | 1200 |
| Embodiment 11 | 0.005 | 110 | 1300 |
| Embodiment 12 | 0.001 | 110 | 1300 |

TABLE 4

|  | Remaining amount of Sr element (% by weight) | Brightness (cd/m$^2$) | Life (hours) |
| --- | --- | --- | --- |
| Comparative Example 4 | 0.02 | 70 | 1000 |
| Embodiment 13 | 0.01 | 100 | 1200 |
| Embodiment 14 | 0.005 | 110 | 1300 |
| Embodiment 15 | 0.001 | 110 | 1300 |

TABLE 5

|  | Remaining amount of Ba element (% by weight) | Brightness (cd/m$^2$) | Life (hours) |
| --- | --- | --- | --- |
| Comparative Example 5 | 0.08 | 70 | 1000 |
| Embodiment 16 | 0.01 | 100 | 1200 |
| Embodiment 17 | 0.005 | 120 | 1300 |
| Embodiment 18 | 0.001 | 140 | 1500 |

As obvious from Tables 2 to 5, among the alkaline earth metal elements, for Mg, when its remaining amount is 0.03% by weight or less, the brightness was approximately 1.4 times or more. For Ca, Sr and Ba, when the remaining amount of each of them was 0.01% by weight or less, the brightness thereof was approximately 1.4 times or more, respectively.

Embodiment 19

First, 500 ml of pure water was added to powder of 500 g of zinc sulfide of a particle diameter of approximately 2 μm to form a slurry. Thereto, 1.5 g of copper sulfate is added, followed by 30-min agitation. The slurry was dried at a temperature of 150° C. for 12 hours. Thereafter, 40 g of magnesium chloride, 20 g of sodium chloride, and 40 g of cesium chloride were added, followed by thorough mixing. The mixture was filled in a quartz crucible, followed by 4-hour firing in air at a temperature of 1150° C.

The fired body was dispersed in pure water of 2000 ml, and agitation, settling and decantation were repeated successively three times each. Then, while agitating in pure water of which pH was adjusted to be 2.0 by addition of hydrochloric acid, the slurry was heated to a temperature of 70° C. Thereafter, settling and decantation were carried out. Similarly, agitation, settling and decantation were repeated successively three times each. Thereafter, by repeating pure water washing five times, the pH was adjusted to be from 6 to 7, followed by filtration and drying.

The obtained intermediate (hexagonal) was pressed by the use of a hydrostatic pressing at a hydrostatic pressure of 1.0 ton/cm$^2$ for 5 min. The pressed intermediate was crushed. 300 g of the crushed intermediate was mixed with 15 g of zinc oxide. The mixture was fired in a quartz crucible in air at a temperature of 750° C. for 1.5 hour. The fired body was dispersed in pure water to wash. This process was repeated three times. Thereafter, at a condition of pH=1.5, hydrochloric acid washing was carried out. After repeating pure water washing five times, followed by filtration, drying and sieving. Thus, an electroluminescent phosphor (ZnS: Cu, Cl) of the present invention was obtained.

Thus obtained zinc sulfide system electroluminescent phosphor was subjected to chemical analysis. The total amount of the remaining alkaline earth metal elements was 0.05% by weight, and the remaining amount of cesium element was 0.005% by weight. With the obtained zinc sulfide system electroluminescent phosphor, an electroluminescent element was prepared similarly with embodiment 1 and the brightness and life were evaluated. The results are shown in Table 6.

COMPARATIVE EXAMPLE 6

Embodiments 20 to 22

Except for changing an addition amount of cesium chloride, as identical as Embodiment 19, the respective electroluminescent phosphors of the present invention were prepared. With these zinc sulfide system electroluminescent phosphors, similarly with Embodiment 1, the respective electroluminescent elements were prepared. The brightness and life were measured respectively. The results are shown in Table 6.

TABLE 6

|  | Remaining amount of Cs element (% by weight) | Remaining amount of alkaline earth metal elements (% by weight) | Brightness (cd/m$^2$) | Life (hours) |
| --- | --- | --- | --- | --- |
| Comparative Example 6 | 0.0 | 0.05 | 100 | 1000 |
| Embodiment 19 | 0.005 | 0.05 | 160 | 1600 |
| Embodiment 20 | 0.0001 | 0.05 | 140 | 1500 |
| Embodiment 21 | 0.001 | 0.05 | 160 | 1600 |
| Embodiment 22 | 0.01 | 0.05 | 150 | 1500 |

As obvious from Table 6, zinc sulfide system electroluminescent phosphors that include Cs in the range of 0.0001% by weight or more and 0.01% by weight or less, when compared with the phosphor that does not substantially include Cs, can achieve the higher brightness and longer life.

Embodiment 23

On the surface of ZnS: Cu, Cl phosphor that is prepared under the identical condition as Embodiment 1, alumina film (1.0% by weight as alumina) was formed as a protective film. With the alumina coated electroluminescent phosphor (ZnS: Cu, Cl), a strip type electroluminescent element 11 shown in FIG. 2 was prepared, and the brightness and life were evaluated. These results are shown in Table 7. Incidentally, the brightness was measured under the identical condition as Embodiment 1.

COMPARATIVE EXAMPLE 7

Embodiments 24 to 27

On the surface of particles of ZnS: Cu, Cl phosphors prepared similarly with Embodiments 2 to 5, protective films shown in Table 7 were formed respectively. With these electroluminescent phosphors (ZnS: Cu, Cl) that have respective protective films, strip type electroluminescent elements 11 shown in FIG. 2 were prepared respectively and the brightness and life thereof were evaluated. These results are shown in Table 7.

TABLE 7

|  | Phosphor | Protective film | Brightness (cd/m$^2$) | Life (hours) |
| --- | --- | --- | --- | --- |
| Comparative Example 7 | same as comparative example 1 | alumina (1.0%) | 60 | 1200 |
| Embodiment 23 | same as embodiment 1 | alumina (1.0%) | 80 | 1400 |
| Embodiment 24 | same as embodiment 2 | alumina (1.0%) | 100 | 1700 |
| Embodiment 25 | same as embodiment 3 | titania (2.0%) | 110 | 1800 |
| Embodiment 26 | same as embodiment 4 | titania (2.0%) | 115 | 1800 |
| Embodiment 27 | same as embodiment 5 | silica (3.0%) | 120 | 1900 |

COMPARATIVE EXAMPLES 8 to 10

Embodiments 28 to 30

Except for employing a bromide or iodide as a crystal growth agent that is added to slurry containing ZnS powder, as identical as Embodiment 19, ZnS: Cu, Br phosphors and ZnS: Cu, I phosphors were prepared. Here, the content of Cs element is controlled through addition amount of cesium bromide or cesium iodide. With each of these ZnS system electroluminescent phosphors, as identical as Embodiment 1, electroluminescent elements were prepared, and the brightness and life thereof were measured. The results are shown in Table 8.

TABLE 8

|  | Phosphor | Content of Cs element (% by weight) | Remaining amount of alkaline earth metal elements (% by weight) | Brightness (cd/m$^2$) | Life (hours) |
| --- | --- | --- | --- | --- | --- |
| Comparative Example 8 | ZnS: Cu, Br | 0.0 | 0.01 | 130 | 1500 |
| Embodiment 28 | ZnS: Cu, Br | 0.001 | 0.01 | 160 | 1600 |
| Comparative Example 9 | ZnS: Cu, Br | 0.0 | 0.001 | 140 | 1600 |
| Embodiment 29 | ZnS: Cu, Br | 0.0001 | 0.001 | 170 | 1800 |
| Comparative Example 10 | ZnS: Cu, I | 0.0 | 0.01 | 130 | 1500 |
| Embodiment 30 | ZnS: Cu, I | 0.001 | 0.01 | 160 | 1600 |

As obvious from Table 8, even ZnS: Cu, Br phosphor and ZnS: Cu, I phosphor, as identical as ZnS: Cu, Cl phosphor, by reducing the content of alkaline earth metal elements and further by incorporating an adequate amount of Cs element, can attain higher brightness and longer life.

As obvious from the aforementioned embodiments, according to the present invention, due to reduction of the remaining amount of the alkaline earth metal elements in the phosphors of the present invention, electroluminescent phosphors capable of having higher brightness and of maintaining such brightness over a long time period can be obtained. According to electroluminescent panels of the present invention that employ such electroluminescent phosphors, such characteristic as demanded for display device can be satisfied with reproducibility.

While the invention has been particularly shown and described with reference to preferred embodiments thereof, it will be understood by those skilled in the art that various other changes in the form and details may be made therein without departing from the spirit and scope of the invention.

This invention is disclosed in Japanese Patent Application No. 10-240730 filed on Aug. 26, 1998, and the entire disclosure thereof is incorporated herein by reference.

What is claimed is:

1. An electroluminescent phosphor, comprising:
   a phosphor base material consisting essentially of zinc sulfide;
   at least one kind of activator selected from copper and manganese that is included in the phosphor base material; and
   at least one kind of coactivator selected from chlorine, bromine, iodine and aluminum that is included in the phosphor base material;
   wherein the electroluminescent phosphor includes alkaline earth metal elements in the range of 0.05% by weight or less and cesium element in the range of 0.0001% by weight or more and 0.01% by weight or less.

2. The electroluminescent phosphor as set forth in claim 1:
   wherein an amount of magnesium element included in the electroluminescent phosphor is 0.03% by weight or less.

3. The electroluminescent phosphor as set forth in claim 1:
   wherein an amount of calcium element included in the electroluminescent phosphor is 0.01% by weight or less.

4. The electroluminescent phosphor as set forth in claim 1:
   wherein an amount of strontium element included in the electroluminescent phosphor is 0.01% by weight or less.

5. The electroluminescent phosphor as set forth in claim 1:
   wherein an amount of barium element included in the electroluminescent phosphor is 0.01% by weight or less.

6. The electroluminescent phosphor as set forth in claim 1:
   wherein the activator is included in the range of from 0.001 to 0.1% by weight of the phosphor base material.

7. The electroluminescent phosphor as set forth in claim 1:
   wherein the coactivator is included in the range of from 0.001 to 0.1% by weight of the phosphor base material.

8. The electroluminescent phosphor as set forth in claim 1, further comprising:
   a protective film formed on particle surface of the electroluminescent phosphor, the protective film consisting essentially of at least one kind selected from alumina, silica and titania.

9. An electroluminescent phosphor, comprising:
   a phosphor base material consisting essentially of zinc sulfide;
   at least one kind of activator selected from copper and manganese that is included in the phosphor base material; and
   at least one kind of coactivator selected from chlorine, bromine, iodine and aluminum that is included in the phosphor base material;
   wherein the electroluminescent phosphor is formed by using an alkaline earth metal compound, and includes alkaline earth metal elements which are present in an amount of 0.05% by weight or less.

10. The electroluminescent phosphor as set forth in claim 9:
    wherein an amount of magnesium element included in the electroluminescent phosphor is 0.03% by weight or less.

11. The electroluminescent phosphor as set forth in claim 9:
    wherein an amount of calcium element included in the electroluminescent phosphor is 0.01% by weight or less.

12. The electroluminescent phosphor as set forth in claim 9:
    wherein an amount of strontium element included in the electroluminescent phosphor is 0.01% by weight or less.

13. The electroluminescent phosphor as set forth in claim 9:
    wherein an amount of barium element included in the electroluminescent phosphor is 0.01% by weight or less.

14. The electroluminescent phosphor as set forth in claim 9:
    wherein the activator is included in the range of from 0.001 to 0.1% by weight of the phosphor base material.

15. The electroluminescent phosphor as set forth in claim 9:
    wherein the coactivator is included in the range of from 0.001 to 0.1% by weight of the phosphor base material.

16. The electroluminescent phosphor as set forth in claim 9, further comprising:
    a protective film formed on particle surface of the electroluminescent phosphor, the protective film consisting essentially of at least one kind selected from alumina, silica and titania.

17. The electroluminescent phosphor as set forth in claim 9, wherein the electroluminescent phosphor includes the alkaline earth metal elements in the range of from 0.001 to 0.05% by weight.

18. The electroluminescent phosphor as set forth in claim 9, wherein the compound of alkaline earth metal is a crystal growth agent.

19. An electroluminescent element, comprises:
    a phosphor layer that includes an electroluminescent phosphor as set forth in claim 1.

20. The electroluminescent element as set forth in claim 19, further comprising:
    a layer of rear electrode disposed and integrated along one main surface of the phosphor layer through a reflection insulation layer; and
    a layer of transparent-electrode disposed and integrated along other main surface of the phosphor layer.

21. An electroluminescent element, comprises:
    a phosphor layer that includes an electroluminescent phosphor as set forth in claim 9.

22. The electroluminescent element as set forth in claim 1, further comprising:
    a layer of rear electrode disposed and integrated along one main surface of the phosphor layer through a reflection insulation layer; and
    a layer of transparent electrode disposed and integrated along the other main surface of the phosphor layer.

* * * * *